US009406158B2

(12) United States Patent
Yamaji

(10) Patent No.: US 9,406,158 B2
(45) Date of Patent: Aug. 2, 2016

(54) IMAGE PROCESSING APPARATUS, IMAGE PROCESSING METHOD AND RECORDING MEDIUM THAT CREATES A COMPOSITE IMAGE IN ACCORDANCE WITH A THEME OF A GROUP OF IMAGES

(71) Applicant: FUJIFILM CORPORATION, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/493,376

(22) Filed: Sep. 23, 2014

(65) Prior Publication Data
US 2015/0086116 A1 Mar. 26, 2015

(30) Foreign Application Priority Data

Sep. 24, 2013 (JP) .................................. 2013-197300
Aug. 26, 2014 (JP) .................................. 2014-171864

(51) Int. Cl.
*G06K 9/46* (2006.01)
*G06T 11/60* (2006.01)
*G06K 9/00* (2006.01)

(52) U.S. Cl.
CPC ............ *G06T 11/60* (2013.01); *G06K 9/00684* (2013.01)

(58) Field of Classification Search
None
See application file for complete search history.

(56) References Cited

U.S. PATENT DOCUMENTS

| 2006/0061598 | A1* | 3/2006 | Mino et al. ..................... 345/629 |
| 2008/0089590 | A1* | 4/2008 | Isomura et al. ................ 382/217 |
| 2009/0116752 | A1* | 5/2009 | Isomura et al. ................ 382/217 |
| 2009/0164561 | A1* | 6/2009 | Ono et al. ...................... 709/203 |
| 2011/0029860 | A1* | 2/2011 | Ptucha et al. .................. 715/246 |
| 2011/0102858 | A1 | 5/2011 | Iguchi |
| 2011/0234613 | A1* | 9/2011 | Hanson et al. ................. 345/589 |
| 2011/0285748 | A1* | 11/2011 | Slatter et al. ................... 345/629 |
| 2013/0060854 | A1 | 3/2013 | Nakano |
| 2013/0111373 | A1 | 5/2013 | Kawanishi et al. |
| 2014/0009495 | A1* | 1/2014 | Sakai et al. .................... 345/634 |

FOREIGN PATENT DOCUMENTS

| JP | 2007-049387 | 2/2007 |
| JP | 2007-257312 | 10/2007 |
| JP | 2011-040971 | 2/2011 |
| JP | 2013-020325 | 1/2013 |
| WO | 2013005266 | 2/2015 |

OTHER PUBLICATIONS

Japanese Office Action dated Sep. 15, 2015, with partial English Translation; Application No. 2014-171864.

* cited by examiner

*Primary Examiner* — Li Liu
(74) *Attorney, Agent, or Firm* — Young & Thompson

(57) ABSTRACT

In an image processing apparatus, an image acquiring section acquires a group of candidate images for use in creating a recommended composite image to be proposed to a user; an image analysis information acquiring section acquires image analysis information on each image of the group of candidate images; a theme determining section determines a theme of the group of candidate images based on the image analysis information on each image of the group of candidate images; a template selecting section selects a template for use in creating a recommended composite image based on the theme of the group of candidate images; and a layout section creates a recommended composite image in which images of the group of candidate images are laid out in the template.

18 Claims, 5 Drawing Sheets

IMAGE PROCESSING APPARATUS, IMAGE PROCESSING METHOD AND RECORDING MEDIUM THAT CREATES A COMPOSITE IMAGE IN ACCORDANCE WITH A THEME OF A GROUP OF IMAGES

CROSS-REFERENCE TO RELATED APPLICATIONS

The present application claims priority under 35 U.S.C. §119 to Japanese Patent Application No. 2013-197300 filed on Sep. 24, 2013 and Japanese Patent Application No. 2014-171864 filed on Aug. 26, 2014. The above applications are hereby expressly incorporated by reference, in their entirety, into the present application.

BACKGROUND OF THE INVENTION

The present invention relates to an image processing apparatus, an image processing method and a recording medium for automatically creating a recommended product (recommended composite image) in accordance with a theme of a group of images selected from among a large number of images possessed by a user and proposing the recommended product to the user when the user creates a photo product (composite image) such as a photo book.

A photo book is a photo album that is created to have the layout desired by a user with a predetermined number of images selected by the user from among a plurality of images (image data) possessed by the user. Examples of photo products include, in addition to photo books, shuffle prints (in which a plurality of images are randomly arranged on a single mount), post cards and usual photo prints.

Conventionally, a photo book has been expected to be created from about several hundred images taken at one event such as a travel and a wedding. On the other hand, in recent years, by users each having a large number of images but not having time to create a photo book, a photo book is created as a memorial album from a large number of, i.e., 1000 to several thousands of images taken in a year, for instance.

However, there has been a problem in that it is extremely troublesome for a user to select images the user desires to put in a photo book from a large number of images and to think about the layout, i.e., how and which photo to arrange in each page of the photo book.

To cope with it, at present, an automatic layout function is realized in which, by specifying a photographing period of images and the number of pages of a photo book, a predetermined number of images having been specified with the photographing period are automatically selected from among a large number of images, and the layout of respective pages of the photo book which has been specified in terms of the number of pages is automatically created using the predetermined number of images as selected. Consequently, a user can easily produce a photo book from a large number of images without much trouble.

While the number of times users take images (photographs) increases with the growth of mobile phones, smartphones and digital still cameras (DSCs), a large number of images taken with such devices are often stored without being well-organized. In the case where, for instance, a photo book is created using those images, there are a variety of choices such as Examples 1 to 4 shown below as a theme of the photo book.

Example 1

A photo book (year album) created with images taken in a year

Example 2

A photo album recording a child's growth that is created by picking up only images of the child taken in several years

Example 3

A photo book recording an event that is created with images taken at a single event such as a travel and a wedding

Example 4

A photo book created with images related to a user's hobby such as dishes, flowers, landscapes and Bonsai trees However, there has been a problem in that it is extremely troublesome for a user to decide a theme of a photo book by oneself and prepare images according to the theme from among a large number of images. The same can be said for other photo products.

Now JP 2013-20325 A is given as prior art literature related to the present invention.

JP 2013-20325 A describes an information processing apparatus that delivers an image to be given to a friend of a user, the information processing apparatus comprising determination means for determining a relationship between the user and the friend based on the user's activity on a network; acquiring means for acquiring an image to be given to the friend based on the determination by the determination means; layout means for laying out the image acquired by the acquiring means; and delivery means for delivering to the friend the image laid out by the layout means.

SUMMARY OF THE INVENTION

An object of the invention is to overcome the above problem of the prior art and provide an image processing apparatus, an image processing method and a recording medium capable of, with the use of a predetermined group of images among plural images, proposing a composite image created according to a theme of the predetermined group of images to a user.

In order to attain the object described above, the present invention provides an image processing apparatus, comprising:

an image acquiring section configured to acquire one or more groups of candidate images for use in creating a recommended composite image to be proposed to a user;

an image analysis information acquiring section configured to, for each of the one or more groups of candidate images, acquire image analysis information on each image of the group of candidate images;

a theme determining section configured to, for each of the one or more groups of candidate images, determine a theme of the group of candidate images based on the image analysis information on each image of the group of candidate images;

a template selecting section configured to, for each of the one or more groups of candidate images, select one or more templates for use in creating a recommended composite image based on the theme of the group of candidate images; and a layout section configured to, for each of the one or more groups of candidate images, create one or more recommended composite images in each of which images of the group of candidate images are laid out in each of the one or more templates.

Also, the present invention provides an image processing method, comprising:

a step of acquiring, by an image acquiring section, one or more groups of candidate images for use in creating a recommended composite image to be proposed to a user;

a step of, for each of the one or more groups of candidate images, acquiring image analysis information on each image of a group of candidate images by an image analysis information acquiring section;

a step of, for each of the one or more groups of candidate images, determining a theme of the group of candidate images based on the image analysis information on each image of the group of candidate images by a theme determining section;

a step of, for each of the one or more groups of candidate images, selecting one or more templates for use in creating a recommended composite image based on the theme of the group of candidate images by a template selecting section; and a step of, for each of the one or more groups of candidate images, creating one or more recommended composite images in each of which images of the group of candidate images are laid out in each of the one or more templates by a layout section.

Also, the present invention provides a non-transitory computer readable recording medium having recorded thereon a program for causing a computer to execute each step of the image processing method according to above.

In the present invention, a theme of a group of candidate images is determined; a template is selected on the basis of the determined theme of the group of candidate images; and a recommended composite image is created using the selected template and the group of candidate images. Owing to this configuration, according to the present invention, it is possible to, with the use of images among a predetermined group of candidate images, create a recommended composite image according to a theme of the predetermined group of candidate images.

DETAILED DESCRIPTION OF THE INVENTION

An image processing apparatus, an image processing method and a recording medium of the present invention are described below in detail with reference to a preferred embodiment shown in the accompanying drawings.

Figure 1:
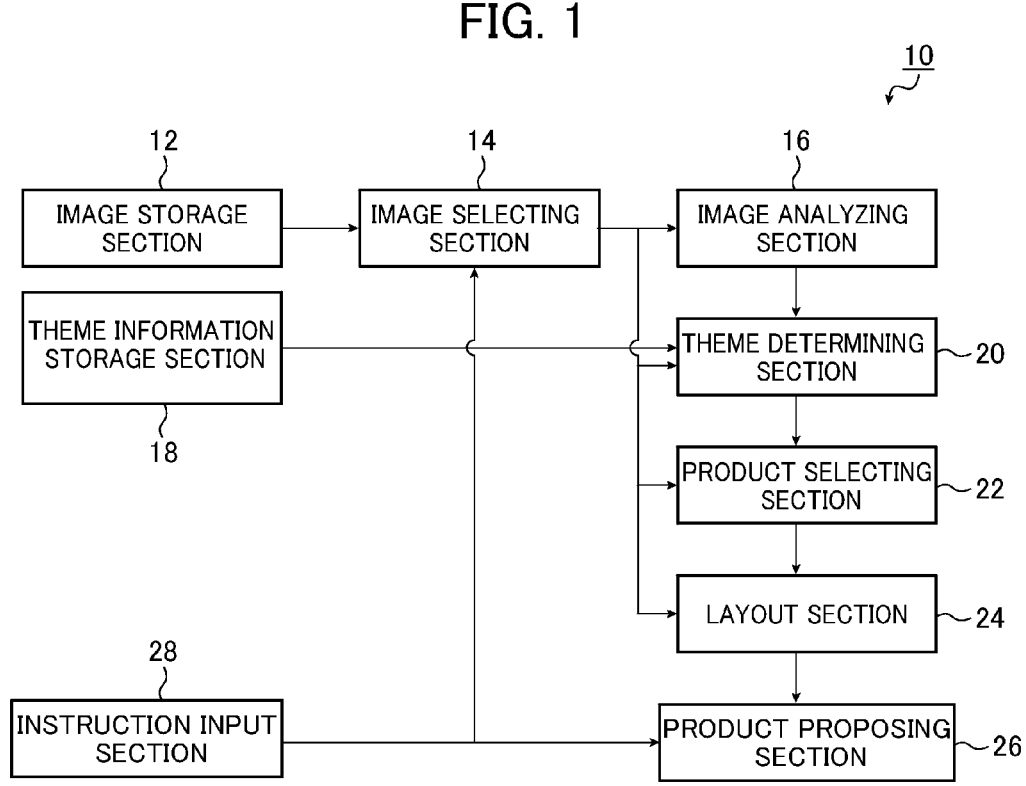
FIG. 1 is a block diagram showing the configuration of an embodiment of an image processing apparatus of the invention.

FIG. 1 is a block diagram showing the configuration of an embodiment of an image processing apparatus of the invention. An image processing apparatus 10 shown in the drawing determines a theme of a predetermined group of images among a large number of images possessed by a user and automatically creates a recommended product (recommended composite image) using the predetermined group of images on the basis of the determined theme so as to propose the recommended product to the user.

The image processing apparatus 10 includes an image storage section 12, an image selecting section 14, an image analyzing section 16, a theme information storage section 18, a theme determining section 20, a product selecting section 22, a layout section 24, a product proposing section 26 and an instruction input section 28.

The image storage section 12 is configured to store plural images possessed by a user.

The image selecting section 14 is configured to select a predetermined number of images (one or more images) from among the plural images stored in the image storage section 12 and select, from among the predetermined number of images as selected, one or more groups of candidate images for use in creating a recommended product to be proposed to the user.

For instance, when the instruction of specifying a predetermined number of images to be used in a photo book is entered through the instruction input section 24 to be described later, the image selecting section 14 selects the predetermined number of images according to the instruction from among the plural images, analyzes a photographing date of each of the selected predetermined number of images, the number of images and other information, and selects one or more groups of candidate images from among the predetermined number of images in accordance with a predetermined image selection condition set in advance.

Instead of the above-described configuration in which the image processing apparatus 10 stores therein plural images, selects a predetermined number of images from among the stored plural images and selects one or more groups of candidate images from among the selected predetermined number of images, the image processing apparatus 10 may be configured not to have the image storage section 12 or the image selecting section 14 but to have an image acquiring section that acquires one or more groups of candidate images entered from the exterior of the image processing apparatus 10.

Alternatively, the image acquiring section may select one or more groups of candidate images from among a predetermined number of images entered from the exterior of the image processing apparatus 10 and acquire the selected one or more groups of candidate images.

Still alternatively, the image acquiring section may select a predetermined number of images from among plural images entered from the exterior of the image processing apparatus 10, select one or more groups of candidate images from among the selected predetermined number of images and acquire the selected one or more groups of candidate images.

The image selecting section 14 is capable of, from among the predetermined number of images, as the one or more groups of candidate images, selecting a group of images whose photographing dates fall within a predetermined photographing period set in advance, such as the entire period and a period set on a year basis or a month basis, on the basis of the photographing date of each image.

For instance, the image selecting section 14 unconditionally selects all images taken in the entire photographing period of the predetermined number of images as the one or more groups of candidate images regardless of the type of the predetermined number of images.

When the photographing period of the predetermined number of images is one year or longer, the image selecting section 14 may select a group of images grouped on a year basis (images taken in one year), e.g., images taken in the year 2011, 2012 or the like, as the one or more groups of candidate images. Images taken in one year may be images whose photographing dates fall within a one-year period starting from any given date, e.g., one year from April, 2011 to March, 2012, or starting from a specific anniversary such as a child's birthday, for example.

When the photographing period of the predetermined number of images is one month or longer and at least a certain number of images were taken in every month, the image selecting section 14 can select a group of images grouped on a month or months basis (images taken in several months), e.g., images taken in one month, three months, six months or the like, as the one or more groups of candidate images.

Alternatively, the image selecting section 14 can select, from among the predetermined number of images, a group of images grouped on an event basis, i.e., images taken at a specific event such as a travel and a wedding on the basis of the photographing date and the number of images taken in each photographing date as the one or more groups of candidate images.

Figure 2:
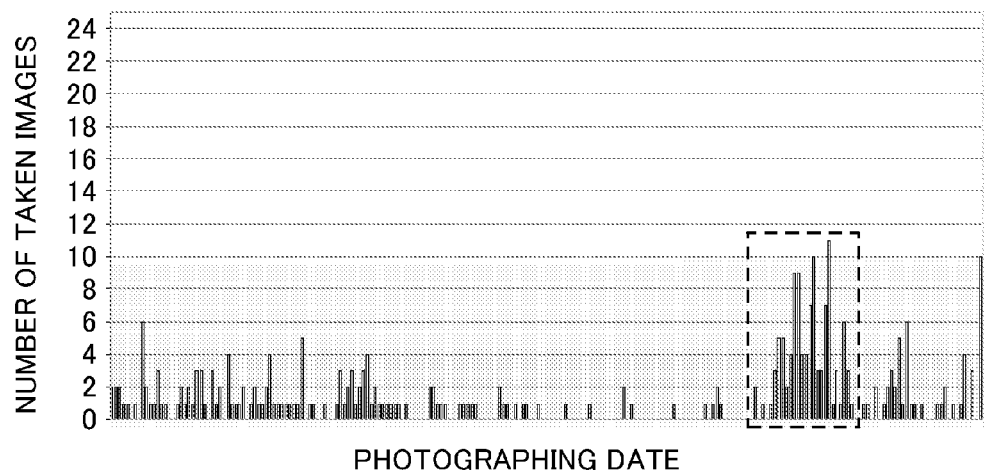
FIG. 2 is a graph illustrating an exemplary relation between the photographing date and the number of taken images.

FIG. 2 is a graph illustrating an exemplary relation between a photographing date of an image and the number of taken images. The horizontal axis in the drawing represents a photographing date of an image while the vertical axis represents the number of taken images. As can be seen from the drawing, while the number of taken images per day is small in the case of daily snapshots, the number of taken images per day is larger in the case of images taken at an event such as a travel compared to daily snapshots. Therefore, the image selecting section 14 determines images whose photographing dates fall within a photographing period in which the number of taken images per day is not less than a predetermined number set in advance, as a group of images taken at a specific event.

Alternatively, the image selecting section 14 can select, from among the predetermined number of images, a group of images grouped on a location basis, i.e., images taken at a specific place (in a photographing area) on the basis of the photographing location of each image with the use of global positioning system (GPS) information contained in header information (accessory information) of each image as the one or more groups of candidate images.

For instance, when the predetermined number of images consist of images taken in a period from 2010 to 2012, the image selecting section 14 selects all images taken in the entire period from 2010 to 2012, images taken in 2010, images taken in 2011, images taken in 2012, event images taken at an event that took place in a period from the 23rd to 26th of Nov., 2010, event images taken at an event that took place in a period from the 6th to 8th of Jul., 2011, and the like as groups of candidate images.

Furthermore, the image selecting section 14 can select, from among the predetermined number of images, a group of images having a common image analysis result as the one or more groups of candidate images on the basis of image analysis information on each image as acquired by the image analyzing section 16 to be described later.

For instance, the image selecting section 14 selects, as a group of candidate images, images whose image analysis results have evaluation scores equal to or higher than a predetermined threshold value set in advance. Alternatively, for instance, the image selecting section 14 can select images whose photographing dates are the same, images showing the same person, images showing the same scene, images whose photographing locations are the same, images showing the same object and the like as a group of candidate images.

However, if the number of groups of candidate images, i.e., the number of recommended products to be proposed to a user is increased too much, this troubles the user in selecting a product and therefore, the number of groups of candidate images may be modified depending on the photographing period of the predetermined number of images. For instance, when the photographing period is two years or more, a group of candidate images are selected on a year basis; when the photographing period is one year or more but less than two years, a group of candidate images are selected on a year basis or a month basis; when the photographing period is six months or more but less than one year, a group of candidate images are selected on a three-month basis; and when the photographing period is less than six months, a group of candidate images are selected on a month basis.

It should be noted that an image selection condition applied when the image selecting section 14 selects a group of candidate images from among the predetermined number of images is not limited to the foregoing examples, and various image selection conditions may be set.

The image analyzing section 16 is configured to perform image analysis on each image of the one or more groups of candidate images selected by the image selecting section 14, thereby acquiring image analysis information.

The image analysis herein means analysis of the characteristics of a subject in an image, and use may be made of various analysis methods including known analysis methods. Examples of the image analysis include face detection/face recognition, scene recognition (night view, sea, hills with autumn tints, sand beach, sky and the like) and object recognition (Kinkaku-ji or Temple of the Golden Pavilion, Statue of Liberty, dish, flower, cake and the like). In addition, an evaluation score of each image analysis result or a total evaluation score of all image analysis results may be calculated and obtained as an image analysis result.

Instead of the above-described configuration in which the image processing apparatus 10 acquires image analysis information by therein performing image analysis on each image of the one or more groups of candidate images, the image processing apparatus 10 may be configured not to have the image analyzing section 16 but to have an image analysis information acquiring section that acquires image analysis information on each image of the one or more groups of candidate images by receiving the image analysis information entered from the exterior of the image processing apparatus 10. In this case, image analysis information only has to be linked with a corresponding image. Specifically, image analysis information may be accompanied with a corresponding image, or may be stored independently of a corresponding image.

Alternatively, the image analysis information acquiring section may perform image analysis on each image of the one or more groups of candidate images to produce image analysis information on each image of the one or more groups of candidate images and acquire the produced image analysis information, similarly to the image analyzing section 16.

The theme information storage section 18 is configured to store, as theme information, information on photography tendencies of images in association with a predetermined number of themes (one or more themes).

The term "theme" used herein refers to a keyword representing the atmosphere or the impression of an image that a user receives upon viewing the image, and exemplary themes include a field day and a birthday. The information on photography tendencies of images is information on conditions under which images of respective themes tend to be taken, and includes the number of faces of imaged persons and the size of the faces, a brightness value, the variation in brightness, zoomed in or not, and a photographing time range, for example.

In the theme information storage section 18, the information on photography tendencies of images is stored in advance. For instance, as shown in Table 1, information for the theme of "field day" is stored as follows: the maximum number of faces is large; the average brightness is high; the variation in brightness is small; and there are many zoomed images. In the case of the theme of "birthday," as shown in Table 2, the information on photography tendencies of images is stored in advance, for example, as follows: the minimum brightness is low; the variation in brightness is large; the photographing time range of the event is short; and the face size is large. This configuration also applies to other themes.

TABLE 1

| Theme | Photography tendency | Supplementary note |
| --- | --- | --- |
| Field day | The maximum number of faces is large. | Faces of children other than a user's child are often present in images of a field day. |
| | The average brightness is high. | A field day takes place outdoors. |
| | The variation in brightness is small. | A field day takes place outdoors (not many images taken indoors). |
| | There are many zoomed images | A person to be imaged is zoomed in and imaged during a game as impossible to approach him/her. |

TABLE 2

| Theme | Photography tendency | Supplementary note |
| --- | --- | --- |
| Birthday | The minimum brightness is low. | There is a scene of blowing out candles with the light off. |
| | The variation in brightness is large. | Images are taken with the light on/off. |
| | The photographing time range is short. | |
| | The size of a face is large. | The proportion of main guest closeup images is high. |

The theme determining section 20 is configured to determine a theme of each of the one or more groups of candidate images selected by the image selecting section 14 on the basis of the information on photography tendencies of images associated with each of the predetermined number of themes stored in the theme information storage section 18 as well as the image analysis information on each image of the one or more groups of candidate images.

For example, if it is determined on the basis of the image analysis information on face detection/face recognition as acquired by the image analyzing section 16 that the number of images showing a specific person is equal to or greater than a predetermined number set in advance, the theme determining section 20 determines that the images are mainly focused on the specific person and that a theme of a group of candidate images is "specific person focused."

Furthermore, if it is determined on the basis of the image analysis information on scene recognition that the number of images showing the sea is equal to or greater than a predetermined number set in advance, the theme determining section 20 determines that a theme of a group of candidate images is "sea." The theme determining section 20 similarly makes determination for the image analysis information on object recognition.

The theme determining section 20 can also determine a theme of a group of candidate images by referring to the information on photography tendencies of images associated with each of a predetermined number of themes and the image analysis information on each image of a group of candidate images together. This method enables the theme determining section 20 to determine a theme of a group of candidate images more accurately.

Note that the use of the information on photography tendencies of images associated with each of a predetermined number of themes is not essential for the theme determining section 20 in determining a theme of a group of candidate images.

When a group of candidate images is a group of images whose photographing dates fall within a predetermined photographing period set in advance such as the entire period and a period set on a year basis or a month basis, the group of candidate images may contain two or more sub-groups of candidate images for use in creating recommended products to be proposed to a user.

Figure 3:
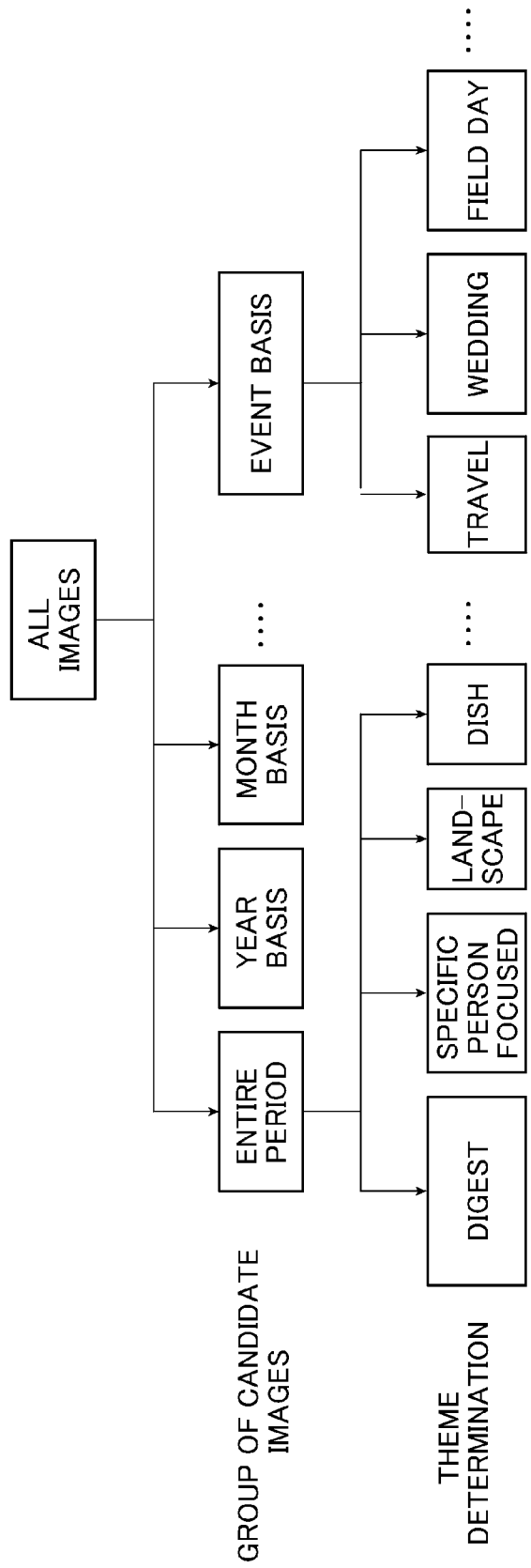
FIG. 3 is a conceptual diagram showing groups of candidate images and their themes by way of example.

For instance, in the case of a group of candidate images of the entire period, the theme determining section 20 determines a theme (e.g., digest, specific person focused, landscape, dish or the like) of each of two or more sub-groups of candidate images, as shown at the left of FIG. 3. This configuration similarly applies to a group of candidate images of another photographing period.

The theme "digest" is a theme to be employed in creating a recommended product using images extracted equally from a group of images whose photographing dates fall within a predetermined photographing period set in advance. The theme "specific person focused" is a theme to be employed in creating a recommended product using images showing a specific person (e.g., a user's child) who most frequently appears according to face detection/face recognition of image analysis from among a group of images whose photographing dates fall within a predetermined photographing period set in advance. This configuration similarly applies to other themes such as "landscape" and "dish."

The theme "specific person focused" may be specified by an instruction input through the instruction input section 28. When, for instance, a group of candidate images is a group of images taken at a specific event and grouped on an event basis, this group of candidate images is one group of images related to the specific event.

In this case, the theme determining section 20 determines a theme of the group of candidate images, i.e., one theme corresponding to the group of candidate images, such as a travel, a wedding and a field day, as shown at the right of FIG. 3. In other words, the group of candidate images contains one sub-group of candidate images for use in creating a recommended product to be proposed to a user.

When the predetermined number of images consist of images taken in a period from 2010 to 2012 as described above and when, for instance, a group of candidate images consists of all images taken in the entire period from 2010 to 2012, the theme determining section 20 determines two or more themes (e.g., digest, specific person focused, landscape and dish) corresponding to two or more sub-groups of candidate images. This configuration similarly applies to a group of candidate images of another photographing period. Furthermore, the theme determining section 20 determines the theme "travel" as a theme corresponding to the event images taken in a period from the 23rd to 26th of Nov., 2010 on the basis of these event images, and the theme "wedding" as a theme corresponding to the event images taken in a period from the 6th to 8th of Jul., 2011 on the basis of these event images.

The product selecting section (template selecting section) 22 is configured to select one or more product templates for use in creating a recommended product to be proposed to a user for each of the one or more groups of candidate images selected by the image selecting section 14 on the basis of a theme of each group of candidate images as determined by the theme determining section 20 and the number of images of each group of candidate images.

When a group of candidate images contains two or more sub-groups of candidate images, the product selecting section 22 selects a product template for each of the two or more sub-groups of candidate images.

On the basis of the number of images of a group of candidate images, when the group of candidate images is determined to consist of images not fewer than a predetermined number set in advance, the product selecting section 22 selects, as the one or more product templates, a template of a product having plural pages such as a photo book. In contrast, when the group of candidate images is determined to consist of images fewer than the predetermined number set in advance, the product selecting section 22 selects, as the one or more product templates, a template of a product composed of a single mount such as a shuffle print and a post card.

Note that it is not essential for the product selecting section 22 to utilize the number of images of a group of candidate images in selecting the one or more product template.

In the case where a group of candidate images consists of images taken in the year 2011 as shown in Table 3 for instance, when sub-groups of candidate images contained in the group of candidate images each consist of images not fewer than a predetermined number set in advance, e.g., respectively consist of 1300, 500 and 400 images, the product selecting section 22 selects a photo book as the one or more product templates. On the other hand, in the group of candidate images consisting of images taken in the year 2011, when a sub-group of candidate images consists of images fewer the predetermined number set in advance, e.g., consist of 23 images, the product selecting section 22 selects, for instance, a shuffle print as the one or more product templates. The same applies to other cases.

TABLE 3

| Group of candidate images | Theme | Number of images | Recommended product |
|---|---|---|---|
| Images of 2011 | Digest | 1300 | Photo book |
| | Specific person focused | 500 | Photo book |
| | Landscape | 400 | Photo book |
| | Dish | 23 | Shuffle print |
| | | | Normal print |
| ... | | | |

TABLE 3-continued

| Group of candidate images | Theme | Number of images | Recommended product |
|---|---|---|---|
| Event images of 2010 Nov. 23-26 | Travel | 128 | Photo book |
| Event images of 2011 Jul. 6-8 | Wedding | 89 | Photo book Post card |

In addition, the product selecting section 22 is capable of changing the size of each of the one or more product templates in accordance with a theme of the group of candidate images.

For instance, when a theme of the group of candidate images is "specific person focused" and a selected template is a photo book, the product selecting section 22 selects a template of a relatively large, A4-size photo book. When a theme of the group of candidate images is "dish" and a selected template is a photo book, the product selecting section 22 selects a template of a relatively small photo book in a size of a compact disc (CD) case.

The layout section 24 is configured to create one or more recommended products in each of which images of any of the one or more groups of candidate images selected by the image selecting section 14 are laid out in any of the one or more product templates.

When a group of candidate images contains two or more sub-groups of candidate images, the layout section 24 creates a recommended product for each of the two or more sub-groups of candidate images.

The term "product template" used herein refers to a template of a photo book, a shuffle print, a post card or the like before images are laid out. The term "recommended product" used herein refers to a product after images are laid out in such a product template.

The product proposing section (composite image proposing section) 26 is configured to propose the one or more recommended products created by the layout section 24 to a user.

For instance, the product proposing section 26 proposes the one or more recommended products to a user by displaying the recommended products on a display unit. In this case, the product proposing section 26 can display the one or more recommended products through any displaying method, for example, by causing the recommended products to appear on the display unit one by one in a predetermined order set in advance.

Finally, the instruction input section 28 is used by a user to input various instructions such as the instruction of specifying the predetermined number of images to be used in a photo product from among the plural images stored in the image storage section 12, the instruction of specifying the number of pages of a photo product when the photo product has plural pages, the instruction of specifying a product template, and the instruction of specifying a desired one from among the one or more recommended products proposed by the product proposing section 26.

Figure 4:
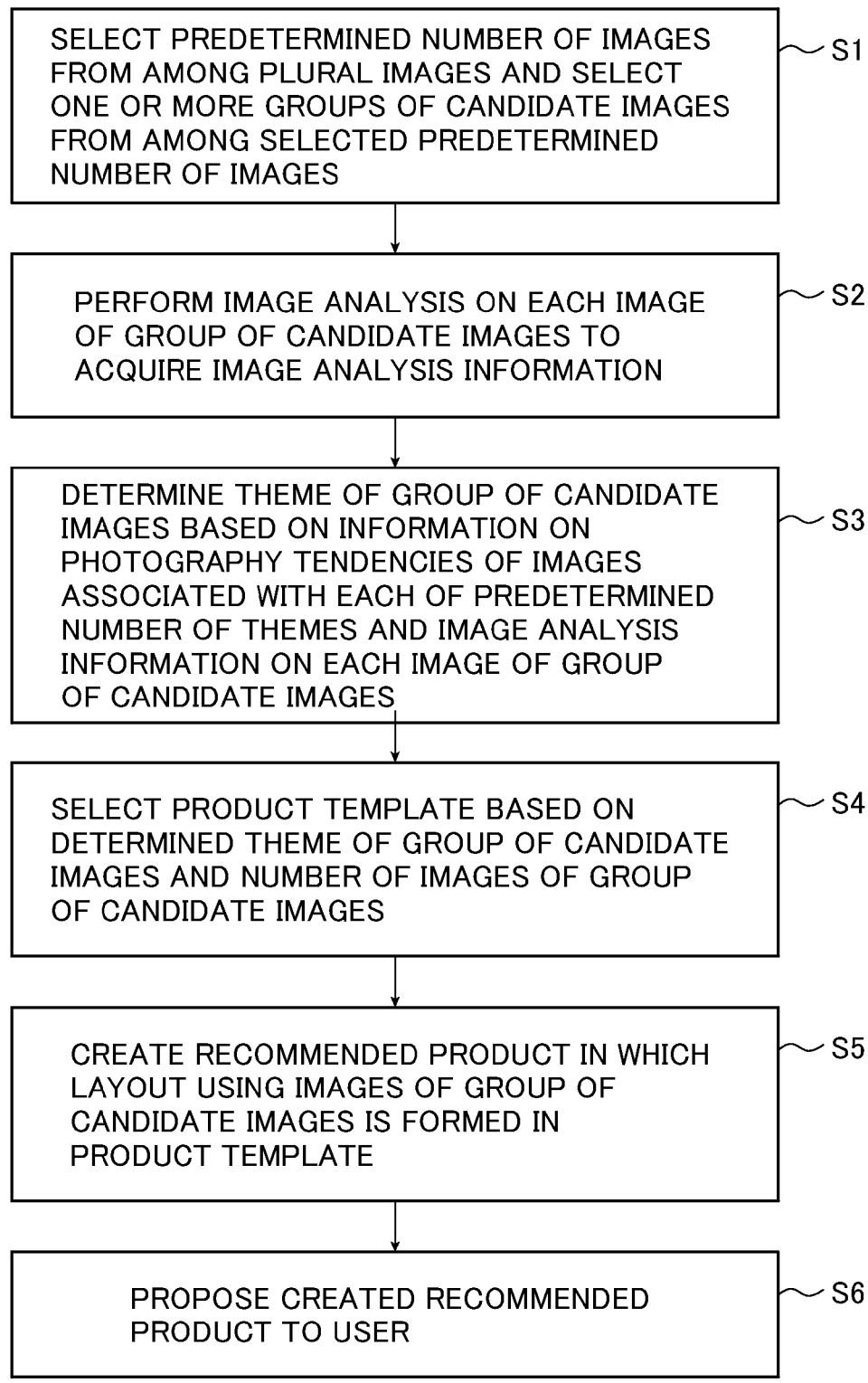
FIG. 4 is a flowchart of an example of the operation of the image processing apparatus shown in FIG. 1.

Next, the operation of the image processing apparatus 10 according to the image processing method of the invention is described with reference to the flowchart shown in FIG. 4.

For instance, when the instruction of specifying a predetermined number of images for use in a photo book is entered through the instruction input section 28, the image selecting section 14 selects the predetermined number of images from among plural images stored in the image storage section 12 in accordance with the instruction. The image selecting section 14 then selects one or more groups of candidate images for use in creating a recommended product from among the selected predetermined number of images in accordance with a predetermined image selection condition set in advance (Step S1).

Upon selection of the one or more groups of candidate images, the image analyzing section 16 performs image analysis on each image of the one or more groups of candidate images selected by the image selecting section 14, thereby acquiring image analysis information (Step S2).

Next, the theme determining section 20 determines a theme of each of the one or more groups of candidate images selected by the image selecting section 14 on the basis of the information on photography tendencies of images associated with each of a predetermined number of themes that is stored in the theme information storage section 18 and on the basis of the image analysis information on each image of the one or more groups of candidate images (Step S3).

Next, the product selecting section 22 selects one or more product templates for use in creating a recommended product for each of the one or more groups of candidate images selected by the image selecting section 14 on the basis of the theme of each group of candidate images as determined by the theme determining section 20 and the number of images of each group of candidate images (Step S4).

Subsequently, the layout section 24 creates one or more recommended products in each of which images of each of the one or more groups of candidate images selected by the image selecting section 14 are laid out in each of the one or more product templates (Step S5).

For example, the layout section 24 may divide images of a group of candidate images into a predetermined number of groups, select a specified number of images from each of the predetermined number of groups, and create the layout in each page of a photo book with the selected, specified number of images.

Next, the product proposing section 26 proposes the one or more recommended products created by the layout section 24 to a user (Step S6).

The user can order a desired recommended product by inputting the instruction of specifying the desired recommended product from among the one or more recommended products through the instruction input section 28.

The image processing apparatus 10 determines a theme of a group of candidate images, selects a product template on the basis of the determined theme of the group of candidate images, creates a recommended product using the selected product template and the group of candidate images, and proposes the created recommended product to a user. Owing to this configuration, the image processing apparatus 10 is capable of automatically creating a photo product with the use of a predetermined group of images contained in the plural images in accordance with a theme of the predetermined group of images and proposing the photo product to a user.

It should be noted that the image processing apparatus 10 is able to determine the one or more groups of candidate images and a recommended product to be preferentially proposed to a user not automatically but on the basis of an instruction input by the user through the instruction input section 28.

For instance, when the number of pages specified by an instruction input through the instruction input section 28 is equal to or greater than a predetermined number set in advance, the image selecting section 14 can select, as the one or more groups of candidate images, a group of images whose photographing dates fall within a longer photographing period compared to the case where a specified number of pages is less than the predetermined number set in advance.

As an example, when the predetermined number of pages set in advance is thirty and the number of pages as specified is sixteen, the image selecting section 14 determines that the number of pages is relatively small and selects a group of candidate images grouped on a month basis or an event basis, in other words, does not select a group of candidate images of the entire period or a group of candidate images grouped on a year basis. On the other hand, when the number of pages as specified is sixty, the image selecting section 14 determines that the number of pages is relatively large and selects a group of candidate images containing many images such as a group of candidate images of the entire period and a group of candidate images grouped on a year basis.

When a product template specified by an instruction input through the instruction input section 28 is a template of a photo book, the image selecting section 14 can select, as the one or more groups of candidate images, a group of images whose photographing dates fall within a longer photographing period compared to the case where a specified product template is a template of a post card.

The image selecting section 14 preferentially selects a group consisting of a large number of images when a specified product template is a photo book template, and preferentially selects a group having a small number of images when a specified product template is a post card template.

When a product template specified by an instruction input through the instruction input section 28 is a template of a shuffle print, the image selecting section 14 can select, as the one or more groups of candidate images, a group of images taken at a specific event that took place during a period in which the number of taken images per day is not less than a predetermined number set in advance.

In the case where a specified product template is a shuffle print template, the image selecting section 14 preferentially selects a group of candidate images grouped on an event basis because a shuffle print having a suitable number of images arranged on a single mount is able to give a sense of unity.

When a product template specified by an instruction input through the instruction input section 28 is a template of a post card, the product proposing section 26 can preferentially propose a recommended product in which images of a group of candidate images corresponding to a specific theme are laid out in a post card template.

When a specified product template is a post card template, the image selecting section 14 preferentially selects a group of candidate images corresponding to a specific theme, such as a wedding, to which a post card is suitable.

The image processing apparatus 10 can determine which recommended product to preferentially propose on the basis of a season or personal information of a user.

For instance, on the basis of a current season, the product proposing section 26 can preferentially propose a recommended product in which images of a group of candidate images consisting of images taken in a photographing period corresponding to the current season are laid out in a product template.

For instance, when a user orders a photo product in April or thereabout, the product proposing section 26 preferentially proposes a recommended product created with a group of candidate images taken in the photographing period from March to April.

Further, on the basis of a user's personal information, the product proposing section 26 can preferentially propose a recommended product in which images of a group of candidate images consisting of images taken in a photographing period corresponding to the user's specific anniversary are laid out in a product template.

For instance, when the time a user orders a photo product is close to a birthday of the user's child, the product proposing section 26 preferentially proposes a recommended product created with a group of candidate images mainly showing the child and taken in the past year.

In the case where a user orders a photo product about a year after the user's wedding, the product proposing section 26 preferentially proposes a recommended product created with a group of candidate images whose theme is a wedding. The user may not have enough time to create a photo product such as a photo book because he/she should be busy immediately after the wedding. However, a proposal of a photo product having the theme of wedding about a year after the wedding can remind the user of the wedding and motivate the user to buy a photo product.

Furthermore, on the basis of the current time, the product proposing section 26 can preferentially propose a recommended product in which images of a group of candidate images consisting of images taken in a photographing period corresponding to the current time are laid out in a product template.

Alternatively, on the basis of a time specified by an instruction input through the instruction input section 28, the product proposing section 26 may preferentially propose a recommended product created with a group of candidate images consisting of images taken in a photographing period corresponding to the specified time.

The photographing period corresponding to the current time or the specified time as described above is not limited in any sense as long as the photographing period corresponds to the current time or the specified time that is considered as highly important. Hereinafter, an important photographing period is described by way of two examples.

For instance, the product proposing section 26 preferentially proposes a recommended product created with a group of candidate images consisting of images taken in a predetermined photographing period set in advance which corresponds to the current time or the specified time (e.g., a group of images taken during the night when the current time or the specified time is the time at night).

With this configuration, in the case where proposed is a recommended product using a group of candidate images consisting of images taken in a photographing period corresponding to the current time, the product proposing section 26 does not propose the same recommended product every time but can propose a recommended product created with different images every time on the basis of the current time.

Meanwhile, when there are a large amount of images, it is difficult to comprehend all the images. To deal with it, the product proposing section 26 preferentially proposes a recommended product created with a group of candidate images consisting of images taken in a predetermined photographing period set in advance which includes the same day one, two or more years ago as the current time or the specified time, or the same day one, two or more years later if the specified time is a time in the past.

Owing to this configuration, it is possible to make a user recall memories of the same month, the same day or the same period a year ago.

Figure 5:
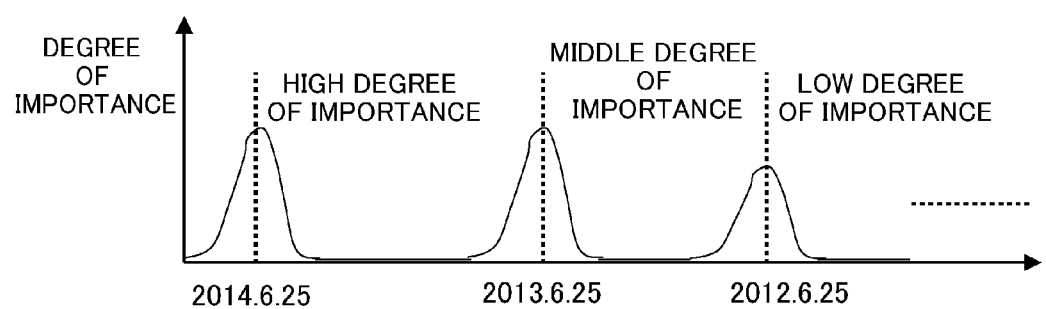
FIG. 5 is a conceptual diagram showing the importance of a group of images taken in a predetermined photographing period including the current time or a specified time, and groups of images separately taken one, two or more years ago in the predetermined photographing period including the same day as the current time or the specified time, by way of example.

When, for instance, the current time or the specified time is Jun. 25, 2014 as shown in FIG. 5, the product proposing section 26 can determine that a group of images taken in a predetermined photographing period including the same day a year ago, Jun. 25, 2013, a group of images taken in the predetermined photographing period including the same day two years ago, Jun. 25, 2012, and so on, are important. Furthermore, the product proposing section 26 can determine that a group of images taken in the predetermined photographing period including Jun. 25, 2014 which is the current time or the specified time is the most important and that the importance gradually decreases in the order of the group of images taken in the predetermined photographing period including the same day a year ago of Jun. 25, 2013, the group of images taken in the predetermined photographing period including the same day two years ago of Jun. 25, 2012, and so on.

The image storage section 12 can store a large amount of images, and a user can additionally store images in the image storage section 12 anytime. Header information of an image stored in the image storage section 12 includes information on a storage date representing a date the image was stored in the image storage section 12.

When proposing a recommended product, the product proposing section 26 takes into account storage dates images were stored in the image storage section 12 and gives a degree of priority to a group of images as in the following (1) to (3).

(1) High priority: A group of images consisting of only new images stored in the image storage section 12 on or after a set date set in advance (2) Middle priority: A group of images consisting of the new images stored in the image storage section 12 on or after the set date and a past image(s) stored in the image storage section 12 on or before the set date (3) Low priority: A group of images selected from all images stored in the image storage section 12

The set date above is used for determining an image of a photographing date that has not yet been used for a recommended product, and is set by the product proposing section 26 as needed. A new image stored in the image storage section 12 on or after the set date is an image of a photographing date that has not yet been used for a recommended product.

Since a recommended product created with a group of images consisting of only new images which were stored in the image storage section 12 on or after the set date has been never proposed as described above, it is desirable to first propose the recommended product created with this group of images consisting of new images.

Therefore, on the basis of a storage time an image was stored in the image storage section 12, the product proposing section 26 gives the highest priority to a first recommended product in which images of a group of candidate images consisting of only new images stored in the image storage section 12 on or after the set date are laid out in a product template, and proposes the same.

When, for instance, there are many images showing a specific person in the group of new images stored in the image storage section 12, the product proposing section 26 extracts an image showing the same specific person from past images stored in the image storage section 12. It is desirable to next propose a recommended product created with a group of images consisting of new images and a past image(s) showing the same specific person.

Therefore, on or after the first recommended product, the product proposing section 26 gives the next highest priority to a second recommended product created with a group of candidate images consisting of the new images stored in the image storage section 12 on or after the set date and a past image(s) as stored in the image storage section 12 on or before the set date, and proposes the same.

Besides, when plural images that meet a display condition are listed and displayed on the basis of the display condition specified by an instruction input through the instruction input section 28, the product proposing section 26 can preferentially propose a recommended product in which images of a group of candidate images consisting of the images meeting the display condition are laid out in a product template.

Figure 6:
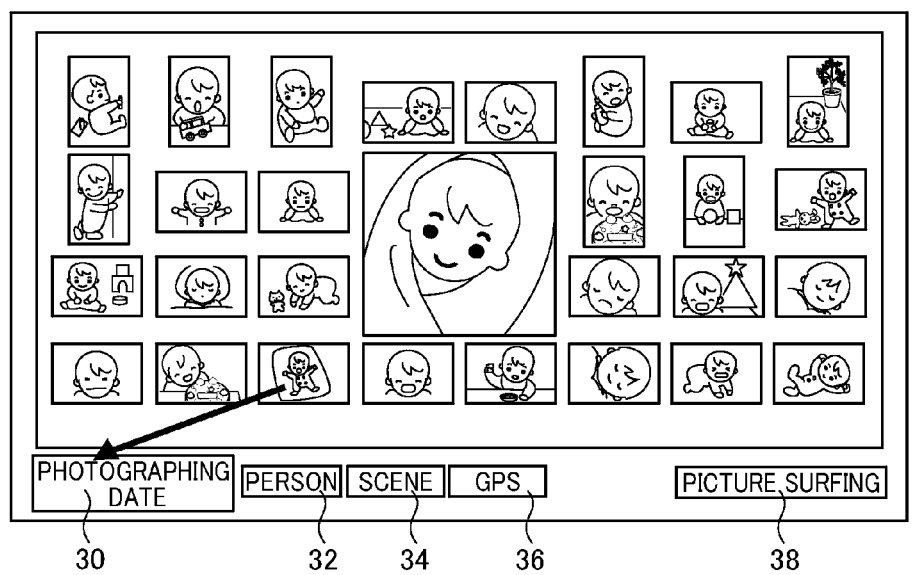
FIG. 6 is a conceptual diagram showing an example of the configuration of a screen when plural images are listed and displayed at a display unit.

FIG. 6 is a conceptual diagram showing an example of the configuration of a screen when plural images are listed and displayed at the display unit. In the drawing, an image specified by an instruction input through the instruction input section 28 is displayed at the center portion of the screen to be larger in size than other images. Plural images showing the same person as in the image at the center portion are arranged around the image at the center portion.

A photographing date button 30, a person button 32, a scene button 34 and a GPS button 36 are displayed at the lower left portion on the screen for use in specifying a display condition of images. The photographing date button 30 is used to specify an image whose photographing date is the same; the person button 32 is used to specify an image showing the same person; the scene button 34 is used to specify an image showing the same scene; and the GPS button 36 is used to specify an image whose photographing location is the same. A picture surfing button 38 is displayed at the lower right portion on the screen for use in inputting an instruction of listing and displaying plural images meeting a display condition.

For instance, when an image positioned at the fourth from the top and third from the left in the drawing is specified according to an instruction input through the instruction input section 28, subsequently the photographing date button 30 is specified as a display condition, and then the picture surfing button 38 is specified, images whose photographing dates are the same as that of the specified image are extracted from images stored in the image storage section 12. Thereafter, the specified image is displayed with a larger size at the center portion of the screen while the extracted images are arranged in lines around the specified image.

Figure 7:
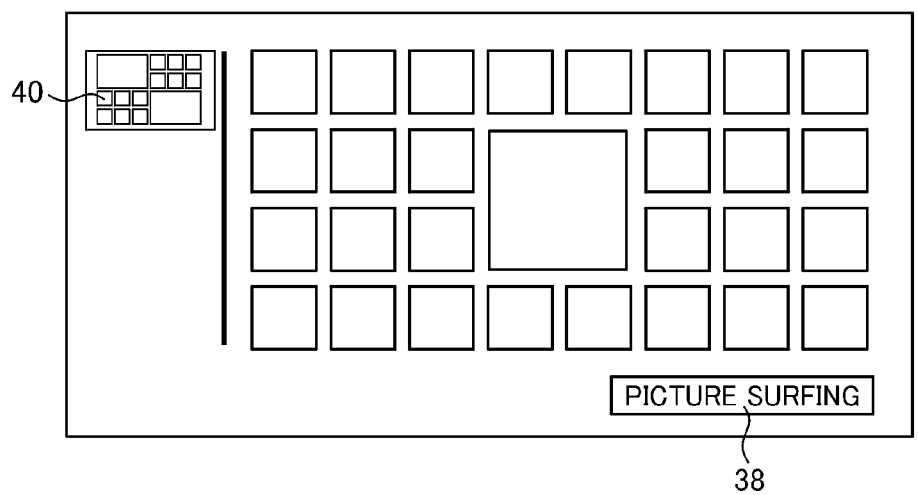
FIG. 7 is a conceptual diagram showing an exemplary case where a recommended product proposed is displayed at the left on the screen.

In the above example, when plural images meeting the display condition of a photographing date are listed and displayed, the product proposing section 26 displays a recommended product 40 created with a group of candidate images consisting of images meeting the specified display condition of a photographing date at the left on the screen so as to propose the same, as shown in FIG. 7.

It should be noted that the display condition is not limited to the foregoing four examples and various display conditions may be used.

Furthermore, on the basis of a plurality of images specified by an instruction input through the instruction input section 28 from among all displayed images, the product proposing section 26 can preferentially propose a recommended product in which images of a group of candidate images consisting of images having the same characteristic as the characteristic shared in common by the plurality of images are laid out in a product template. In other words, an image used in a recommended product can be changed by changing a specified image.

Figure 8:
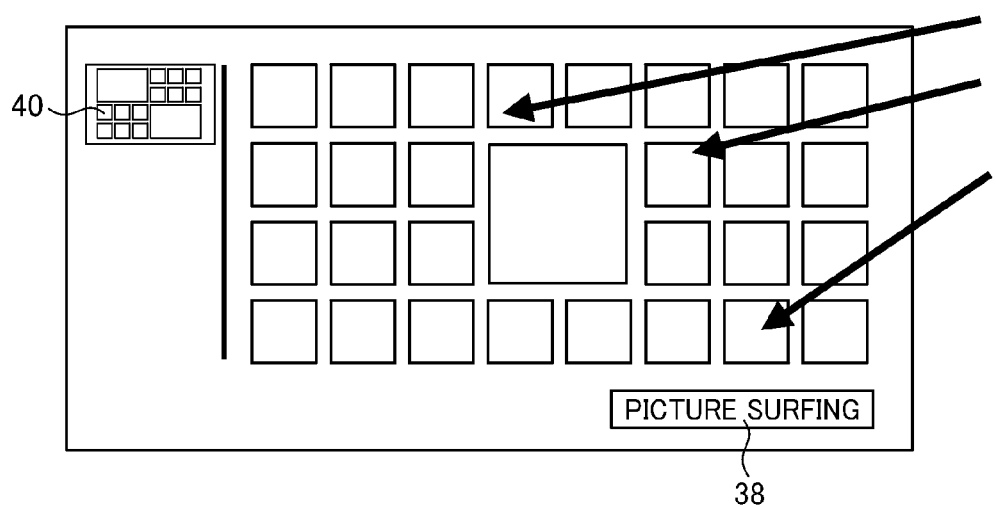
FIG. 8 is a conceptual diagram showing an exemplary case where three images are specified from among listed and displayed plural images.

For instance, when three images are specified by an instruction input through the instruction input section 28 from among all displayed images as shown in FIG. 8, an image to be used in a recommended product is changed according to the common characteristic of the three images specified. As an example, in the case where specified three images share the characteristic in that a specific person is mainly focused, the product proposing section 26 proposes a recommended product in which images showing the specific person are preferentially used.

The method of the present invention can be carried out by, for instance, a program that causes a computer to implement steps of the method. A computer readable recording medium having the program stored therein may also be provided.

This invention is basically as described above.

While the present invention has been described above in detail, the invention is not limited to the above embodiment, and various improvements and modifications may be made without departing from the spirit and scope of the invention.

What is claimed is:

1. An image processing apparatus, comprising:
   an image acquiring section implemented by a programmed computer and configured to acquire one or more groups of candidate images for use in creating a recommended composite image to be proposed to a user;
   an image analysis information acquiring section implemented by the programmed computer and configured to, for each of the one or more groups of candidate images, acquire image analysis information on each image of the group of candidate images;
   a theme determining section implemented by the programmed computer and configured to, for each of the one or more groups of candidate images, determine a theme of the group of candidate images based on the image analysis information on each image of the group of candidate images;
   a template selecting section implemented by the programmed computer and configured to, for each of the one or more groups of candidate images, select one or more templates for use in creating a recommended composite image based on the theme of the group of candidate images; and
   a layout section implemented by the programmed computer and configured to, for each of the one or more groups of candidate images, create one or more recommended composite images in each of which images of the group of candidate images are laid out in each of the one or more templates,
   wherein the template selecting section is configured to change peripheral dimensions of each of the one or more templates itself according to the theme of the group of candidate images.

2. The image processing apparatus according to claim 1, wherein the image analysis information acquiring section is configured to acquire the image analysis information by performing image analysis on each image of the group of candidate images.

3. The image processing apparatus according to claim 1, further comprising:
   a composite image proposing section implemented by the programmed computer and configured to propose the one or more recommended composite images created by the layout section to a user.

4. The image processing apparatus according to claim 3, further comprising:
   an instruction input section implemented by the programmed computer and configured to input various instructions,
   wherein when a template specified by an instruction input through the instruction input section is a template of a post card, the composite image proposing section is configured to preferentially propose a recommended composite image in which images of a group of candidate images corresponding to a specific theme are laid out in a template of the post card.

5. The image processing apparatus according to claim 3, wherein based on a current season, the composite image proposing section is configured to preferentially propose a recommended composite image in which images of a group of candidate images consisting of images taken in a photographing period corresponding to the current season are laid out in the template.

6. The image processing apparatus according to claim 3, wherein based on personal information of the user, the composite image proposing section is configured to preferentially propose a recommended composite image in which images of a group of candidate images consisting of images taken in a photographing period corresponding to a specific anniversary of the user are laid out in the template.

7. The image processing apparatus according to claim 3, wherein based on a current time, the composite image proposing section is configured to preferentially propose a recommended composite image in which images of a group of candidate images consisting of images taken in a photographing period corresponding to the current time are laid out in the template.

8. The image processing apparatus according to claim 3, further comprising:
an instruction input section implemented by the programmed computer and configured to input various instructions,
wherein based on a time specified by an instruction input through the instruction input section, the composite image proposing section is configured to preferentially propose a recommended composite image in which images of a group of candidate images consisting of images taken in a photographing period corresponding to the time specified are laid out in the template.

9. The image processing apparatus according to claim 3, further comprising:
an image storage which stores plural images,
wherein based on a storage date each image was stored in the image storage, the composite image proposing section is configured to give a highest priority to a first recommended composite image in which images of a group of candidate images consisting of only new images stored in the image storage on or after a set date set in advance are laid out in the template, and propose the first recommended composite image.

10. The image processing apparatus according to claim 9, wherein on or after the first recommended product, the composite image proposing section is configured to give a next highest priority to a second recommended composite image in which images of a group of candidate images consisting of the new images stored in the image storage on or after the set date and past images stored in the image storage on or before the set date are laid out in the template, and propose the second recommended composite image.

11. The image processing apparatus according to claim 3, further comprising:
an instruction input section implemented by the programmed computer and configured to input various instructions,
wherein when plural images that meet a display condition are listed and displayed based on the display condition specified by an instruction input through the instruction input section the composite image proposing section is configured to preferentially propose a recommended composite image in which images of a group of candidate images consisting of the plural images meeting the display condition are laid out in the template.

12. The image processing apparatus according to claim 11, wherein based on a plurality of images specified by an instruction input through the instruction input section from among the plural images as listed and displayed, the composite image proposing section is configure to preferentially propose a recommended composite image in which images of a group of candidate images consisting of images having a same characteristic as a characteristic shared in common by the plurality of images specified are laid out in the template.

13. The image processing apparatus according to claim 1, wherein the template selecting section is configured to select the one or more templates based on the theme of the group of candidate images and a number of the images of the group of candidate images.

14. The image processing apparatus according to claim 1, further comprising:
a theme information storage which stores information on photography tendencies of images in association with each of one or more themes,
wherein the theme determining section is configured to determine the theme of the group of candidate images based on the information on the photography tendencies of images associated with each of the one or more themes and the image analysis information on each image of the group of candidate images.

15. The image processing apparatus according to claim 1, wherein the template selecting section is configured to select a template having plural pages as the one or more templates when the group of candidate images consists of images not fewer than a number set in advance, and select a template composed of a single mount as the one or more templates when the group of candidate images consists of images fewer than the number set in advance.

16. The image processing apparatus according to claim 1, wherein for each of the one or more groups of candidate images, when the group of candidate images contains two or more sub-groups of candidate images for use in creating a recommended composite image to be proposed to the user, the theme determining section, the template selecting section and the layout section are configured to perform determination of the theme, selection of the one or more templates, and creation of the one or more recommended composite images, respectively, for each of the two or more sub-groups of candidate images.

17. An image processing method, comprising:
a step of acquiring, by an image acquiring processor, one or more groups of candidate images for use in creating a recommended composite image to be proposed to a user;
a step of, for each of the one or more groups of candidate images, acquiring image analysis information on each image of a group of candidate images by an image analysis information acquiring processor;
a step of, for each of the one or more groups of candidate images, determining a theme of the group of candidate images based on the image analysis information on each image of the group of candidate images by a theme determining processor;
a step of, for each of the one or more groups of candidate images, selecting one or more templates for use in creating a recommended composite image based on the theme of the group of candidate images by a template selecting processor; and
a step of, for each of the one or more groups of candidate images, creating one or more recommended composite images in each of which images of the group of candidate images are laid out in each of the one or more templates by a layout processor,
wherein the step of selecting one or more templates changes peripheral dimensions of each of the one or more templates itself according to the theme of the group of candidate images.

18. A non-transitory computer readable recording medium having recorded thereon a program for causing a computer to execute each step of the image processing method according to claim 17.

* * * * *